(No Model.) 7 Sheets—Sheet 1.

F. F. RAYMOND, 2d.
SOLE NAILING MACHINE.

No. 346,124. Patented July 27, 1886.

WITNESSES
J. M. Dolan
Fred. B. Dolan

INVENTOR
F. F. Raymond 2d

(No Model.)

F. F. RAYMOND, 2d.
SOLE NAILING MACHINE.

No. 346,124. Patented July 27, 1886.

WITNESSES.
J. M. Dolan
Fred. B. Dolan

INVENTOR.
F. F. Raymond 2d (No Model.) 7 Sheets—Sheet 4.

F. F. RAYMOND, 2d.
SOLE NAILING MACHINE.

No. 346,124. Patented July 27, 1886.

WITNESSES
J. M. Dolan
Fred. B. Dolan

INVENTOR
F. F. Raymond (No Model.)  7 Sheets—Sheet 5.

F. F. RAYMOND, 2d.
SOLE NAILING MACHINE.

No. 346,124.  Patented July 27, 1886.

WITNESSES  
J. M. Dolan  
Fred. B. Dolan

INVENTOR  
F. F. Raymond (No Model.) 7 Sheets—Sheet 6.

F. F. RAYMOND, 2d.
SOLE NAILING MACHINE.

No. 346,124. Patented July 27, 1886.

Fig. 11.

WITNESSES.
Fred. B. Dolan
J. M. Dolan

INVENTOR
F. F. Raymond (No Model.)  F. F. RAYMOND, 2d.  7 Sheets—Sheet 7.

SOLE NAILING MACHINE.

No. 346,124.  Patented July 27, 1886.

WITNESSES.
J. M. Dolan
Fred. B. Dolan

INVENTOR
F. F. Raymond 2d

UNITED STATES PATENT OFFICE.

FREEBORN F. RAYMOND, 2D, OF NEWTON, MASSACHUSETTS.

SOLE-NAILING MACHINE.

SPECIFICATION forming part of Letters Patent No. 346,124, dated July 27, 1886.

Application filed January 6, 1886. Serial No. 187,768. (No model.)

*To all whom it may concern:*

Be it known that I, FREEBORN F. RAYMOND, 2d, of Newton, in the county of Middlesex and State of Massachusetts, have invented a new and useful Improvement in Sole-Nailing Machines, of which the following is a full, clear, and exact description, reference being had to the accompanying drawings, forming a part of this specification in explaining its nature.

The invention is an improvement upon that described in my Patent No. 322,562, dated July 21, 1885, and it comprises, first, the employment or use of two templet-plates adapted to be brought successively into operative position, the first adapted for use in nailing a right shoe and the second for use in nailing a left shoe; second, in devices for automatically feeding to the right templet nails arranged in the order required therefor, and for feeding to the left templet nails having the arrangement required for it.

The invention further relates to two beating-out forms, one adapted for use upon a right shoe and the other for use upon a left shoe, arranged to be brought successively into operative position.

The invention relates, further, to details of construction, all of which will be hereinafter fully described.

Referring to the drawings, Figs. 9 and 10 are a detail view and a view of a modification.

A represents the cross-head. It is similar to the one shown and described in the Henderson and Raymond patent, No. 317,647, and it is reciprocated as therein described, or as described in the said Raymond patent, No. 322,562, or in any other desired way. It supports a revolving head, A', which preferably is automatically revolved, as described in the said Henderson and Raymond patent. It is adapted to carry a block, $a$, supporting the gang or group of awls $a'$, arranged for forming the holes in the sole of a right shoe, the block $a^2$ carrying a gang or group of drivers, $a^3$, arranged for driving the nails into the sole of a right shoe and the right pressure-block, $a^4$. It also has a block, $a^5$, supporting a gang or group of awls, $a^6$, arranged to form holes in the sole of a left shoe, block $a^7$, carrying a gang or group of drivers, $a^8$, for driving nails into the sole of a left shoe, and the left pressure-block, $a^9$.

B is the table of the machine.

C is the right jack, and C' the left jack.

D is a post behind the jack, upon which is mounted the table or carriage $d$, arranged to be revolved thereon at intervals by means of the shaft $d'$, the pinion $d^2$ thereon, the sector $d^3$, operated by the cam $d^4$, and the connecting sliding arm or block $d^5$. The table, preferably, is vertically movable. It supports the templet-block E, having its holes arranged for nailing a right shoe, the templet-block E', having its holes arranged for nailing a left shoe, the right-shoe-beating-out form E², and the left-shoe-beating-out form E³. The templet is adapted to be moved into place over the right jack automatically upon the turning movement of the table, and to then come to rest to be moved down upon the sole either by the contact of the awl-block with the upper surface thereof, or as hereinafter described. The nails are then fed to the right templet and driven, the right beating-out form brought into place by the cam and moved downward upon the nailed sole to beat out or finish the shaping of the sole, and then released or moved upward, in order that the shoe may be removed from the right jack and the left jack, having the left shoe thereon, substituted. The machine is again started and the left-shoe templet brought into position, the left-shoe awls reciprocated, the left-shoe nails fed and driven, the left templet removed, and the left beating-out form brought into place, moved down upon the sole to beat it out, and then released.

F is the right nail-carrier block, F' the left nail-carrier block, mounted upon a sliding plate, $f$, which is operated or moved by the link or arm $f'$, lever $f^2$, and cam $f^3$, to move first the right nail-carrier over the right templet, and then the left nail-carrier over the left templet. The plate $f$ is circular in form, and is surrounded by the collar or sleeves $f^4$, to which the arm $f'$ is attached by the yoke $f^5$. The cam and lever serve to move the plate $f$ forward and back at the proper intervals, and the collar permits the plate to be revolved. These nail-carriers are automatically filled with nails from the nail-holders G G', the holder G delivering nails to the right nail-carrier, F, and the nail-holder G' to the left nail-carrier, F'. For feeding the nails to these holders I prefer the form of distributer described in the Towns and Raymond application filed November 27, 1885, Serial No. 184,048—that is, a distributer in which the nail receiving and delivery block is arranged to receive nails as they are made or delivered to it one by one in succession, and then to be moved to bring its holes in register with holes in a block connected with a nail-holder by tubes. It is necessary, however, to arrange or modify the device therein described, so that it will first distribute nails for a right shoe, and then nails for a left shoe; and in order to accomplish this I have formed in the upper plate, H, of the distributer two lines of holes, $h\ h'$. The line of holes $h$ is connected by the tubes $h^2$ with the right distributer, F, and the line of holes $h'$ by the tubes $h^3$ with the left distributer, F'. The nail receiving and delivery block H' has one line, $h^4$, of holes only, and it is like in every respect that described in the said Towns and Raymond application. With the exception hereinafter named it is operated as therein described, receives nails as therein specified, and is returned automatically to deliver them at the end of its backward movement.

Instead of delivering its nails at once automatically into the holes of the upper block of the distributer at the end of its backward movement, the nail receiving and delivery block is then moved laterally first to discharge its first load into the holes $h$. It is then moved back to its original position and forward again to receive another load of nails, then backward again, and then laterally in a direction to discharge its load into the holes $h'$ of the distributer, so that, first, a gang or group of nails for the right shoe is made and delivered, and then a gang or group of nails for the left shoe. To provide the block with these traversing movements at the end of its backward movement, I have attached the cord or device moving it backward thereto by a block, M, having a dovetail projection arranged in a dovetail recess in the end of the nail receiving and delivery block, so that the nail receiving and delivery block may be moved laterally in relation thereto. I have also made the guide and cap plates $m^2$, for holding the nail receiving and delivery block in place, laterally movable by means of the levers $m^3$, which are connected with each other by a strap, $m^4$, at one end of the block, and similar levers, $m^5$, connected by a strap, $m^6$, at the other end of the block, and the rods or shafts $m^7$, extending from one of each set of levers downward, each of which is connected with its operating-cam $m^8$ by the arm $m^9$ and cam-pin $m^{10}$. These cams $m^8$ are arranged upon a shaft, $m^{11}$, which is geared to the cam-shaft $m^{12}$, so that it makes one revolution to every two revolutions of the cam-shaft. The cams $m^8$ are so shaped and timed as to throw the fingers or levers $m^3\ m^5$ after each backward movement of the block H', first in one direction and back, and then in the opposite direction and back. The ends of the fingers or levers $m^3\ m^5$ bear against the sides of the guide and cap plates $m^2$, and preferably are rounded. The guide and cap plates are fitted to the frame of the machine, so that they may be moved laterally or at right angles to the line of movement of the block H' when receiving nails. The nail receiving and delivery block travels while loading upon the uppper block, H, of the distributer midway between the two lines of holes $h\ h'$, so that it is unnecessary to provide it with a hole-covering plate. It is obvious that after it has received its load and moved back upon the movement of the levers or fingers, the block will be moved bodily either to the right or to the left, as may be desired, and I have shaped and timed the cams $m^8$ so that these movements shall alternate; also, that upon being thus moved the holes $h^4$ are first brought in register with the holes $h$ of the distributer, and the nails delivered thereto, and the block immediately moved back, and after receiving another load of nails it is moved to bring the holes $h^4$ in line with the holes $h'$, and after delivering a load of nails the block is returned to be set in operation to receive its next load.

It will be seen from the above description that the nail-delivery block H' is provided with these movements: first, a forward movement to receive its load of nails; second, a backward movement; third, a lateral movement upon its supporting-plate H, to bring its holes $h^4$ in register with the holes $h$; fourth, a return movement to its original position; fifth, another forward movement to receive another gang of nails; sixth, a return movement or backward movement; seventh, another lateral movement in an opposite direction from the one first named, to bring its holes $h^4$ in register with the holes $h'$; eighth, a return movement to its normal position; and it will be seen that these movements are accomplished by means of properly-timed cams, connecting-rods, and levers, which connect the cams with the guide or cap plates $m^2$, and move the cap-plates laterally upon the plate H. In other words, the cap-plates are moved by the fingers or levers, connecting devices, and cams, to carry or cause the block H' to be moved to bring its holes $h^4$ successively in line with the holes $h\ h'$, while the block H is free to be moved lengthwise the cap-plates while receiving its load of nails.

Figures 1, 7, 8:
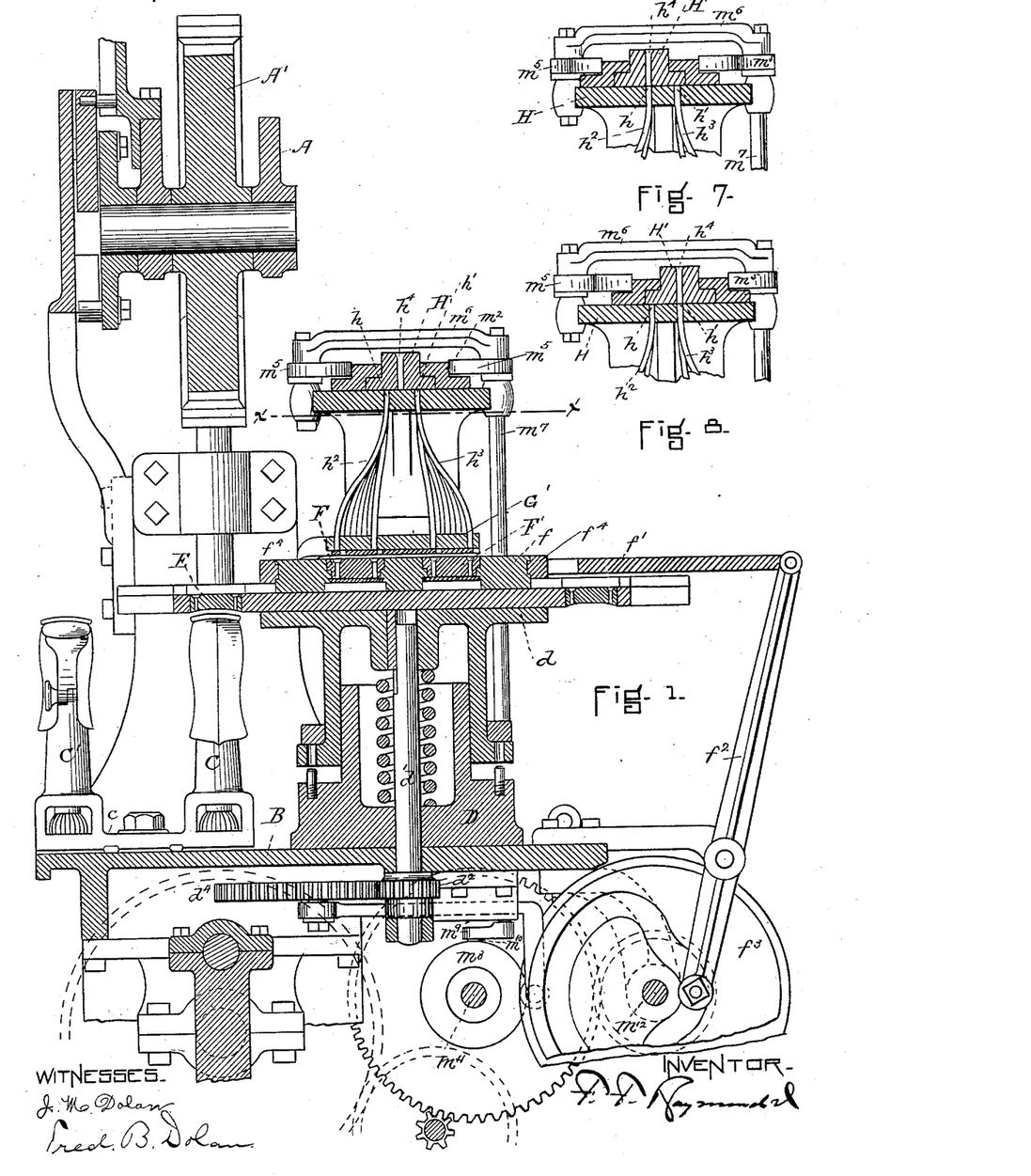
Figure 1 is a view representing in vertical section and in elevation the central and upper parts of a machine containing the features of my invention.
Fig. 7 is a detail view, part in elevation and part in section, illustrating the position of the nail receiving and delivery block upon the delivery of its nails to one line of nail-distributing holes or passages.
Fig. 8 is a similar view showing the position of the nail receiving and delivery block upon the delivery of its load of nails to another line of nail-distributing passages or tubes.
Figure 2:
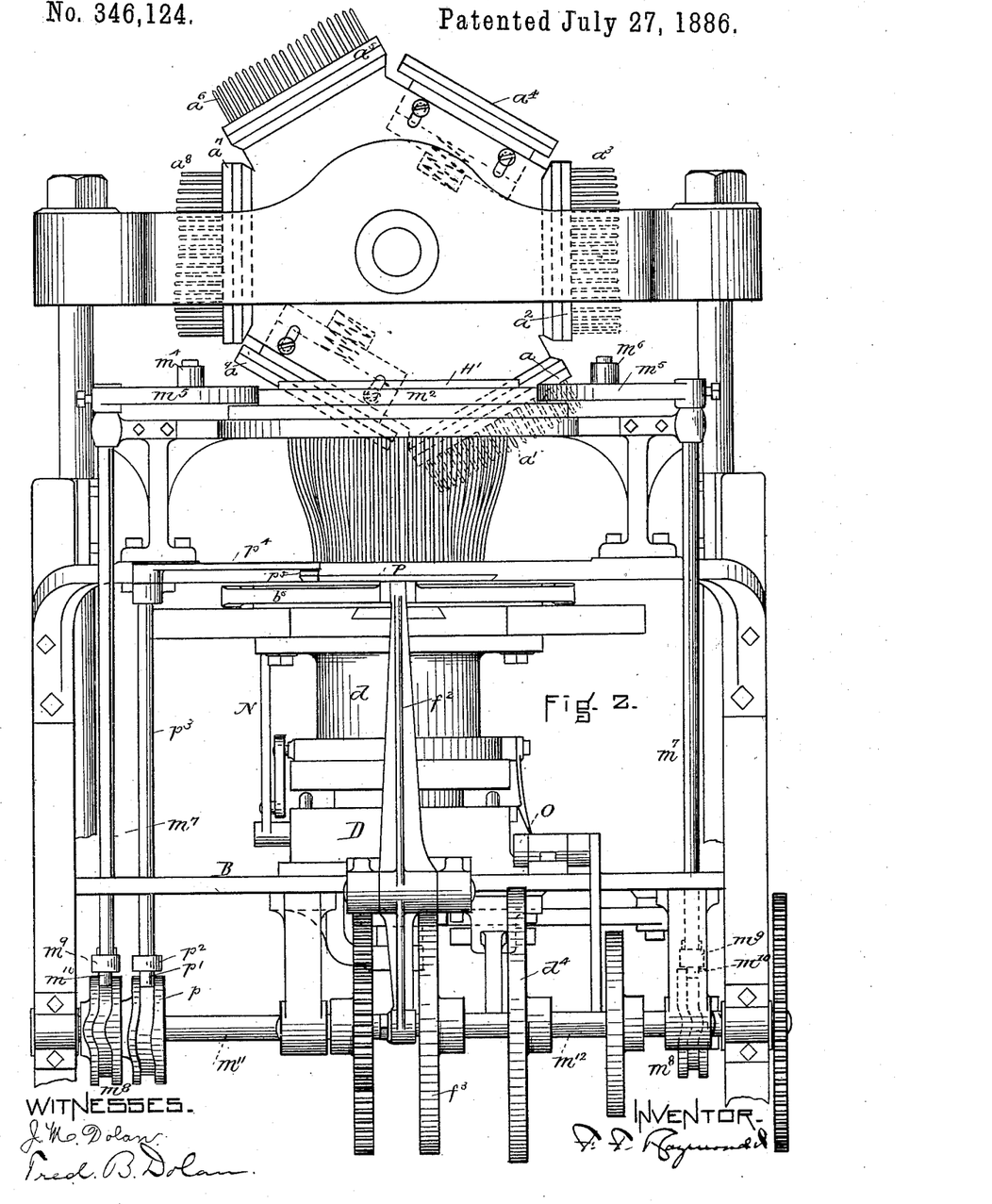
Fig. 2 is a rear elevation of the central and upper parts of the machine.

In Figs. 1, 7, and 8 the various positions of the block H' are well shown.

The mechanism for moving the block forward and back, and for automatically supplying it with nails, is described in my application No. 184,048, filed November 27, 1885.

Figure 3:
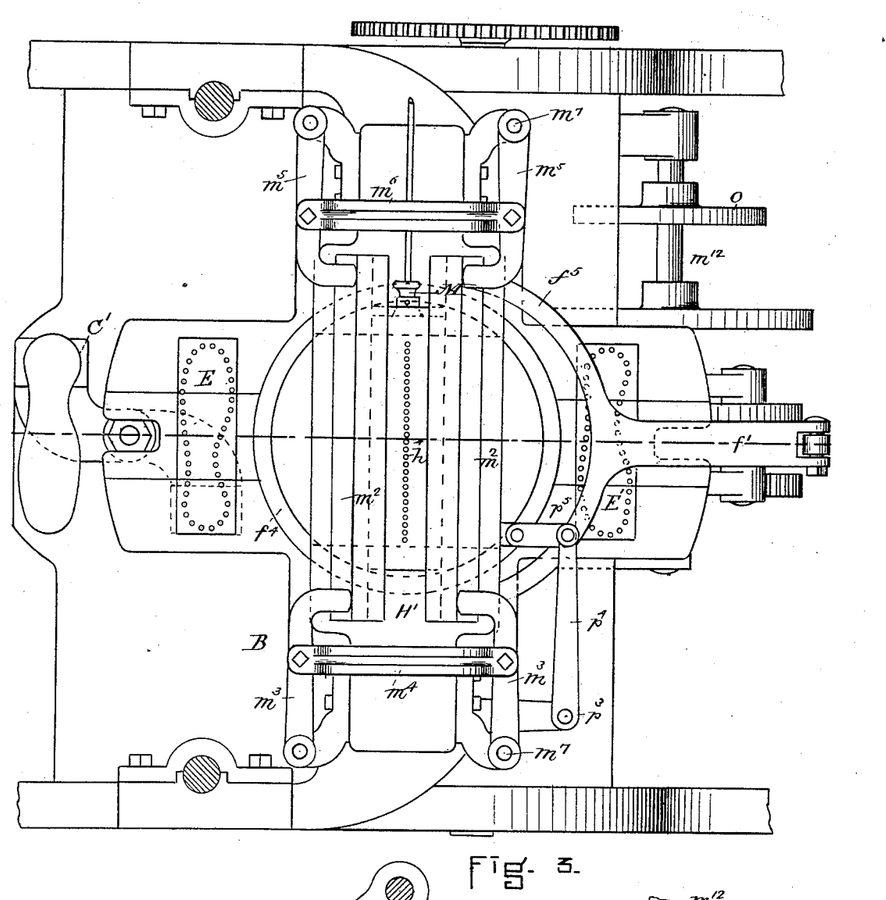
Fig. 3 is a view in plan of the parts below the cross-head and revolving head of the machine.
Figure 4:
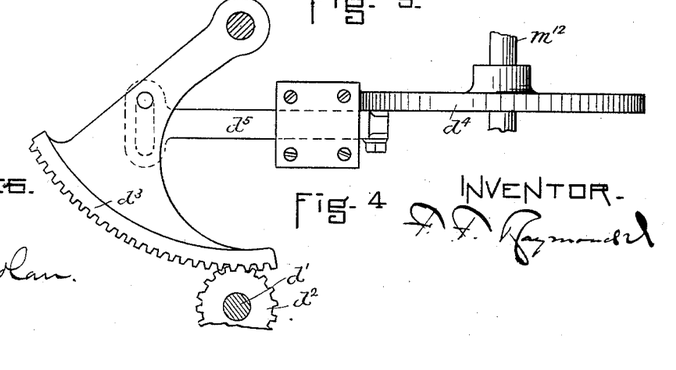
Fig. 4 is a detail view illustrating one form of mechanism for revolving the templet and beating-out form.
Figure 5:
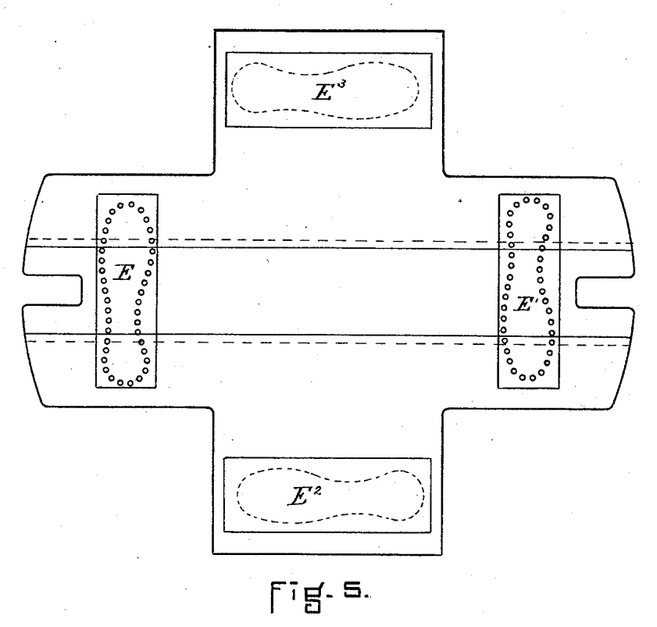
Fig. 5 is a plan view of the table supporting the templets and beating-out forms.
Figure 6:
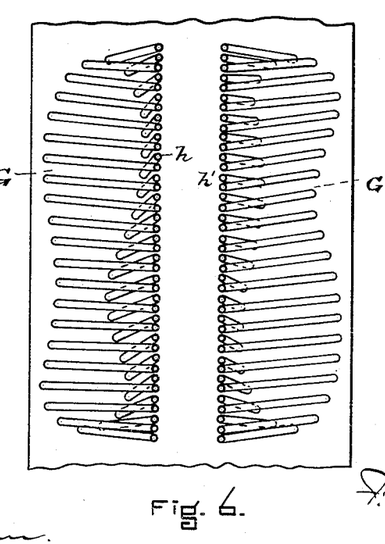
Fig. 6 is a horizontal section upon the line *x x* of Fig. 1, and a plan of the parts immediately below said line, to represent the arrangement of the nail-distributing tubes into right and left forms.
Figure 7:
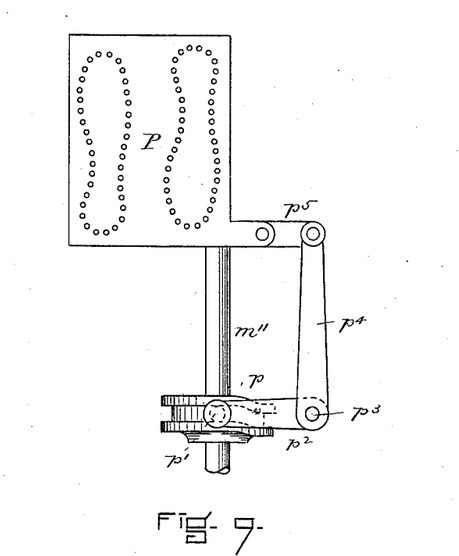
Figure 10:
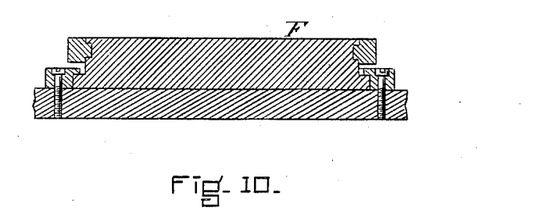
Figure 11:
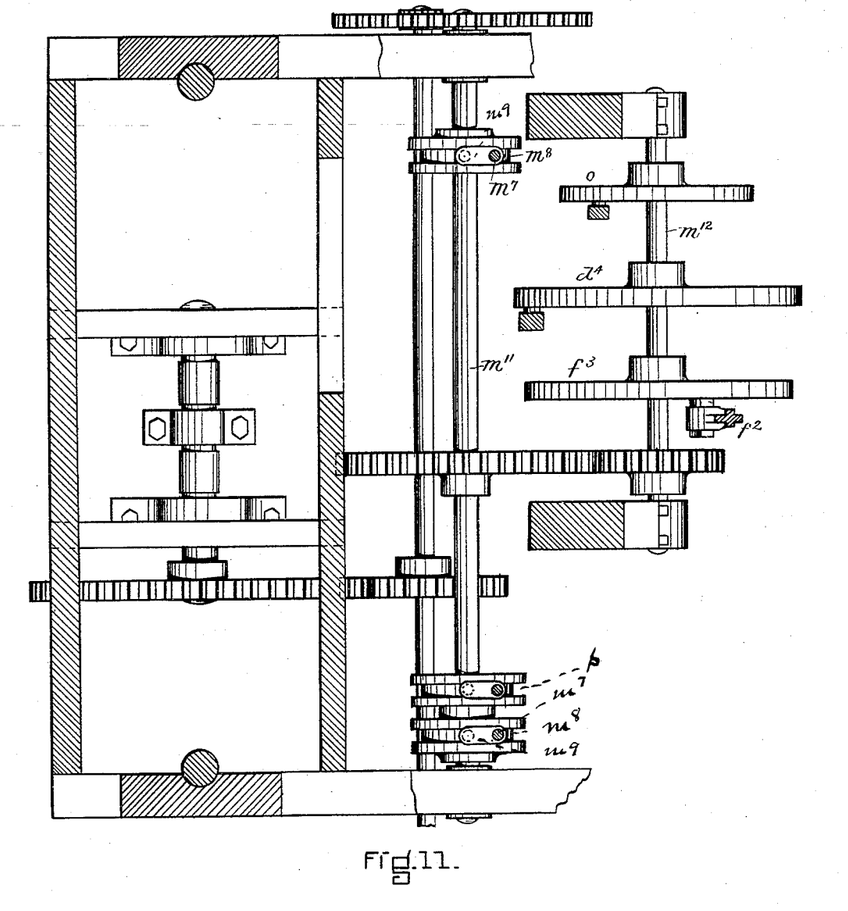
Fig. 11 is a view in horizontal section, to show the two cam-shafts and the cams thereon.
Figure 12:
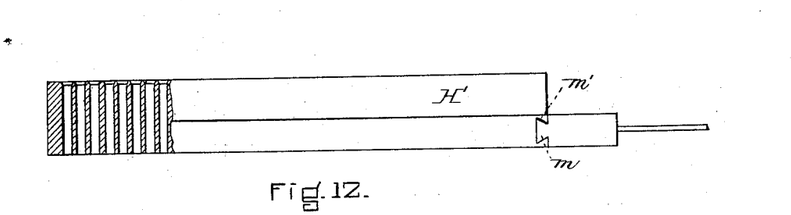
Fig. 12 is a view to illustrate the nail receiving and delivery block and its slide block, to which reference is hereinafter made.
Figure 13:
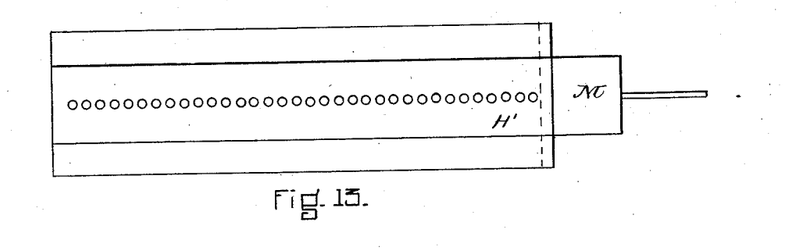
Fig. 13 is a plan in view thereof.
Figure 14:
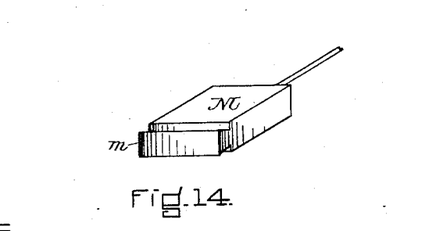
Fig. 14 is a view in end elevation, representing a dovetail extending across the slide-block.

The fingers $m^3\ m^5$ and the cross-pieces $m^6$ connecting them are well shown in Fig. 3.

I may use a single jack; but I prefer to use a double jack, or one having a plate, $c$, adapted to be revolved upon the bed, and carrying two last or work supports, C C', one adapted to hold the right last and the other the left, whereby right and left shoes may be successively presented to the nailing devices without removing either from its support.

In operation the right shoe is mounted on the right jack and moved into place. A sole, if not previously placed, is then located in position over the shoe and the right templet moved down by the lever N upon the sole. The machine is then set in operation. The awls are reciprocated to form the awl-holes in the outsole, the templet forced down upon the sole by the awl-block and locked automatically, continuing the pressure upon the sole, the right nail-carrier moved forward to deposit its nails in the right templet, the drivers reciprocated to drive the nails therefrom into the outsole, and the nail-carrier moved backward, the templet swung or moved on the arc of a circle, bringing the right beating-out or shaping form into position over the nailed sole. Another reciprocation of the cross-head moves the pressure-block into position and forces the beating-out form down upon the sole which has been attached and locks it there, and the machine then comes to rest, the table in such case being unlatched to release the shoe held under the beating-out form by hand, or the table may be unlatched by the unlatching-lever O and cam $o$ on the cam-shaft $m^{12}$. The nailed shoe is then moved out of position, and the left shoe and jack moved into position, and the operation is continued as before, with this difference, that the left templet and left nail-carrier, and left beating-outform are brought into successive action, instead of those previously used, as well as the left-shoe awls, drivers, and pressure-block. The nail making or sorting devices for supplying the nail receiving and delivery block are set in operation by the sole-nailing machine, and a gang or group of nails is delivered to each nail-holder, which are discharged therefrom simultaneously into the two carriers, as hereinafter described. In other words, the two gangs or group of nails required for the right and left shoes are made and delivered successively to the nail-holders, but are discharged from them into the nail-carriers simultaneously. This discharge preferably takes place during the reciprocation of the right-shoe awls. The nail-holders have the perforated covering-plate P, (see Fig. 9,) which is operated by a cam, $p$, on the shaft $m^{11}$, pin $p'$, and arm $p^2$ to uncover and cover the holes at the desired times. The line of holes $h$ in the block H is straight, and the tubes or passages $h^2$, connecting it with the nail-holder G, are shaped and arranged to deliver nails to the holder in the form or arrangement necessary for attaching the right sole of a right shoe, and the tubes $h^3$, connecting the holes $h'$ with the nail-holder G', are arranged to deliver the nails in a form or arrangement for the attachment of a left sole to a left shoe. Upon the starting of the machine the outsole is formed to the surface of the last and held so shaped while awl-holes are being formed therein. The nails are then fed and driven and the sole beaten out, and the machine then comes to rest with the other templet in position to act upon the other shoe. Whether it be right or left, depends upon which shoe is nailed first. All these operations are automatic.

Having thus fully described my invention, I claim and desire to secure by Letters Patent of the United States—

1. In a sole-nailing machine, in combination with one or more last or work supports, the right-sole templet-plate E, the left-sole templet-plate E', and means, substantially as described, for moving them into the same operative position, substantially as described.

2. In a sole-nailing machine, the combination of the right templet E, the left templet E', adapted to be moved successively into the same operative position, with reciprocating nail-driving devices adapted to be used with the right templet and reciprocating nail-driving devices adapted to be used with the left templet, and mechanism, substantially as specified, for moving them successively into operative position, substantially as described.

3. The combination, in a sole-nailing machine, of the right templet E, the left templet E', adapted to be moved successively into the same operative position, with the right nail-carrier F, and the left nail-carrier F', and devices, substantially as described, for alternately moving them into operative positition with their respective templets, substantially as described.

4. The combination, in a nailing-machine, of two nail-carriers with a nail-distributer, consisting of the block H, having two lines of holes, $h$ and $h'$, the nail-holders G G', and the groups $h^2 h^3$ of tubes or passages, one of which groups connects one line of holes with one nail-holder, and the other of which connects the other line of holes with the other nail-holder, all substantially as described.

5. The combination, in a nailing-machine, of the distributer comprising a block having two lines of holes, $h h'$, and two sets of distributing-tubes, $h^2 h^3$, with nail receiving and delivery block adapted to deliver nails first to the line of holes $h$, and then to the line of holes $h'$, all substantially as described.

6. In a nailing-machine, a nail-distributer comprising the block H, having the two lines of holes $h h'$, and the groups $h^2 h^3$ of passages or tubes, substantially as described.

7. The combination of the block H, having the two lines of holes $h h'$, the nail receiving and delivery block H', and devices for moving said block after it has received its load of nails alternately in different or opposite directions, first to a position to bring its holes in register with the holes $h$, and next into register with the holes $h'$, all substantially as described.

8. In a nailing-machine, the combination of a last or work support, the right-sole templet-plate E, the left-sole templet-plate E', the right-sole-beating-out form E², the left-sole beating-form E³, and devices, substantially as specified, for moving them into operative position, all substantially as described.

9. The combination of the nail holder or holders G G', a covering-plate, P, a cam, and connecting devices, all substantially as described.

10. The combination of the block H, having passages $h h'$, the nail receiving and delivery block H', the fingers or levers, and cams, substantially as described.

11. The combination of the plate H, having the holes $h h'$, the nail receiving and delivery block H', the cap guide-plates, the fingers, the connecting-straps, the cams, and connecting devices, all substantially as described.

12. The combination of a plate, H, having two lines, $h h'$, of nail-delivery holes arranged therein, with the nail holding and delivery block H', and devices, substantially as specified, for moving the same longitudinally and transversely upon said plate H, to bring its holes in register successively with each line of holes of said plate, substantially as described.

13. The combination of the templet-plate having guides for the carrier-plate $f$, said carrier-plate $f$, the collar $f^4$, surrounding the nail-carrier plate, the yoke $f^5$, arranged to lay hold of the collar, and devices, substantially as specified, for reciprocating the yoke at stated intervals, substantially as described.

14. The combination of the templet-plate supporting the right and left sole nailing-templets, a post, a shaft, the pinion thereon, the sector, a cam, and the sliding bar operated thereby and connected with the sector, all substantially as described.

15. The combination of the templets, the nail-holders, the cam-shaft and cams thereon for operating the templets and nail-holders, the nail-distributers, the nail receiving and delivery block, the cam-shaft and cams thereon for moving the nail receiving and delivery block, as specified, all substantially as described.

FREEBORN F. RAYMOND, 2D.

Witnesses:
FRED. B. DOLAN,
J. M. DOLAN.